Patented May 3, 1949

2,468,859

UNITED STATES PATENT OFFICE 2,468,859

PREPARATION OF DERIVATIVES OF CHOLESTEROL

Austin Ernest Bide, Ralph John Nicholls, and Peter Alfred Wilkinson, London, England, assignors to Glaxo Laboratories Limited, Greenford, England, a British company No Drawing. Application March 10, 1947, Serial No. 733,723. In Great Britain March 25, 1946

7 Claims. (Cl. 260—397.2)

This invention is concerned with improvements in and relating to the preparation of derivatives of cholesterol, which substance may be represented by the formula

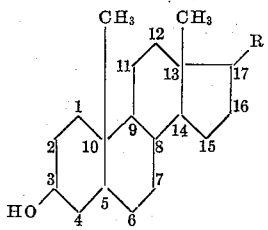

where R is a saturated open-chain hydrocarbon residue.

It is known that the 7-dehydro-derivative of cholesterol, which has an additional double bond in the 7-8 position, is a provitamin and on irradiation with ultra-violet light yields vitamin $D_3$.

British Specification No. 574,432 describes a process for the preparation of 7-dehydro-derivatives of certain sterols including cholesterol, in which a 3-ester of the sterol is reacted with a suitable N-halogenated acid amide or imide, preferably N-bromosuccinimide and the resulting halogenated product is dehydrohalogenated with a suitable organic base, preferably diethyl- or dimethyl-aniline.

We have now found an alternative and convenient method for preparing 7-halogeno-derivatives of cholesteryl esters which can, if desired, be readily converted by dehydrohalogenation for example as described in the said British specification, into 7-dehydrocholesteryl esters. This method is based on the use, as halogenating agents, of compounds selected from the group consisting of N-bromobenzamide, N-bromo-m-nitrobenzamide, N-bromo-p-nitrobenzamide and N-bromo-3:5-dinitrobenzamide, of which we prefer to use N-bromo-m-nitrobenzamide. According to one feature of the invention we provide a process for the production of preparations of 7-bromo-derivatives of cholesteryl esters in which a carboxylic acid ester of cholesterol is reacted in a suitable solvent with a compound selected from the group consisting of N-bromobenzamide, N-bromo-m-nitrobenzamide, N-bromo-p-nitrobenzamide and N-bromo-3:5-dinitrobenzamide.

The resulting solution containing the 7-halogenated cholesteryl ester can be utilised for conversion to 7-dehydrocholesteryl esters by any suitable means, such for example as the methods described in British Specification 574,432.

As a further feature of the invention, therefore, the solution containing the reaction product may be further treated, as for example by any of the methods described in the said prior specification, so as to dehydrohalogenate the said product and to produce the ester of 7-dehydrocholesterol, which can, of course, be hydrolysed if desired.

The term "suitable ester" as used herein means an ester of a carboxylic acid, excluding any ester the acyloxy fragment of which contains any grouping which reacts either with the halogenator or halogenators or with the halogenated cholesterol, it being understood that the term acyloxy is used in its broad sense and does not merely imply derivatives of aliphatic acids. It may here be stated that we prefer to use cholesteryl acetate.

By the term "suitable solvent" we mean one which under the reaction conditions is inert or substantially inert to both the reaction components and products, and which under the reaction conditions does not give rise to undesirable side-reactions as hereinafter mentioned. Among the suitable solvents which we may use are light petroleum fractions, especially 60–80° C. petrol, carbon tetrachloride, benzene and cyclohexane.

We have found it to be generally desirable to employ relatively low-boiling solvents such as those mentioned, and to use solvents of a high degree of purity.

The reaction is carried out at elevated temperature, and it is preferable but not generally essential to heat the mixture to the boiling point of the solvent, preferably with agitation, especially if operating below such temperature.

It should be noted that not all "suitable halogenators" will give good results with all "suitable solvents" when operating at the boiling points of the latter or in some cases even below such temperatures. We have found that with certain combinations of reaction components, such for example as cholesteryl acetate, N-bromobenzamide and chloroform, there is at elevated temperatures a tendency for undesirable side-reactions to occur which partly or wholly prevent the desired halogenation of the cholesteryl ester. To some extent this tendency, where it occurs, can generally be counteracted by a decrease of reaction temperature, although this will of course lengthen the time required to complete the reaction. Obviously it will be a simple matter to those skilled in the art to determine whether for any particular halogenator, a particular reaction temperature and reaction medium are appropriate.

We prefer to use one molar equivalent of a suitable halogenator calculated with reference to the cholesteryl ester and to continue the reaction until the solution contains no active halogen, by which we mean no halogen which will cause the appearance of iodine when the reaction mixture is shaken with an aqueous solution of potassium iodide.

When the halogenation reaction has been completed we may filter and remove the solvent, preferably under reduced pressure, when there will be left a mixture of halogenated steroids containing a substantial proportion of 7-halogenocholesteryl ester.

This product may, if desired, be dehydrohalogenated so as to obtain the 7-dehydrocholesteryl ester, which can of course be hydrolysed to form 7-dehydrocholesterol. The dehydrohalogenation step is preferably carried out in the manner described in the said prior specification.

The following examples, which are given only as illustrations, describe several ways in which the invention may be carried into effect in cases where it is desired to prepare 7-dehydrocholesterol:

Example 1

In a 500 ml. steam-heated 3-necked flask fitted with a mechanical stirrer and reflux condenser, is placed a solution of cholesteryl acetate (28 g.) in petroleum ether (125 ml.; B. P. 60–80° C.). One molar equivalent of N-bromo-benzamide (13.1 g.) is added, and kept in suspension with vigorous stirring. The reaction mixture is now heated to boiling, and maintained at the boiling point for 20 mins. under reflux. After cooling, the suspended benzamide is filtered off and washed with a little petroleum ether. The united filtrate and washings are concentrated as far as possible in vacuo, and to the oily residue is added diethylaniline (46 ml.). The resulting mixture is heated on the steam bath with gentle agitation for 3 hrs. to effect dehydrobromination, after which it is cooled to room temperature. The addition of petroleum ether (150 ml.; B. P. 60–80° C.) completes the precipitation of diethylaniline hydrobromide which is filtered off and washed with petroleum ether. The filtrate and washings are now transferred to a separatory funnel and washed with 2×125 ml. of 10% hydrochloric acid, followed by 1×125 ml. of 5% aqueous sodium carbonate solution. The solvent is removed under reduced pressure from the petroleum ether layer, and the residue treated with a solution of caustic potash (5 g.) in ethyl alcohol (90 ml.). The last traces of petroleum ether are removed by distilling off about 15 ml. of liquid, and hydrolysis effected by refluxing the remaining solution for 20 mins. After a hot filtration, the filtrate is refrigerated overnight to allow crystallisation to occur. The product is filtered off and washed first with 75 ml. of 90% ethyl alcohol, and then with dry ethyl alcohol. After drying and weighing, the 7-dehydrocholesterol content of the crystalline product is determined spectrographically. There are obtained in this way 17–18 g. of material containing 40% of 7-dehydrocholesterol (overall yield 28% of theory).

Example 2

A solution of cholesteryl acetate (28 g.) in petroleum ether (125 ml., B. P. 80–100° C.) is reacted as in Example 1, for 15 minutes with N-bromobenzamide (13.1 g.) and the resulting mixture of bromosteroids dehydrobrominated with diethylaniline and saponified with alcoholic caustic potash, as described in Example 1. There are obtained 15 g. of material containing 19% of 7-dehydrocholesterol.

Example 3

A solution of cholesteryl acetate (28 g.) in petroleum ether (125 ml. B. P. 60–80° C.) is reacted for 20 minutes with N-bromo-m-nitrobenzamide (16 g.) as described in Example 1 to yield, after dehydrohalogenation and saponification according to Example 1, 18 g. of material containing 41% of 7-dehydrocholesterol.

Example 4

A solution of cholesteryl acetate (28 g.) in petroleum ether (125 ml. B. P. 80–100° C.) is reacted for 15 minutes with N-bromo-m-nitrobenzamide (16 g.) and the resulting product dehydrohalogenated and saponified according to the method described in Example 1, finally to yield 18 g. of steroids containing 37% of 7-dehydrocholesterol.

Example 5

A solution of cholesteryl acetate (28 g.) in cyclohexane (125 ml.) is reacted for 30 minutes as in Example 1 with N-bromo-m-nitrobenzamide (16 g.) to yield, after dehydrohalogenation with diethylaniline and saponification as previously described, 16 g. of a product containing 29% of 7-dehydrocholesterol.

Example 6

A solution of cholesteryl acetate (28 g.) in petroleum ether (125 ml.; B. P. 60–80° C.) is reacted for 90 minutes with N-bromo-p-nitrobenzamide (16 g.) as described in Example 1. The product after dehydrohalogenation and saponification as previously described, yields 15 g. of material containing 24% of 7-dehydrocholesterol.

Example 7

A solution of cholesteryl acetate (28 g.) in petroleum ether (125 ml.; B. P. 60–80° C.) is reacted for 30 minutes with N-bromo-3:5-dinitrobenzamide (19 g.) as described in Example 1. The product, after dehydrohalogenation and saponification as previously described, yields 17 g. of material containing 38% of 7-dehydrocholesterol.

We claim:

1. A process for the preparation of 7-bromo derivatives of carboxylic acid esters of cholesterol which comprises reacting in a solvent a carboxylic acid ester of cholesterol with a compound selected from the group consisting of N-bromobenzamide, N-bromo-m-nitrobenzamide, N-bromo-p-nitrobenzamide and N-bromo-3:5-dinitrobenzamide.

2. A process for the preparation of 7-bromocholesteryl acetate in which cholesteryl acetate is reacted in a solvent with a compound selected from the group consisting of N-bromobenzamide, N-bromo-m-nitrobenzamide, N-bromo-p-nitrobenzamide and N-bromo-3:5-dinitrobenzamide.

3. The process defined in claim 1 in which after completion of the brominating reaction the reaction mixture is filtered and the solvent removed therefrom under reduced pressure.

4. The process defined in claim 1 in which the solvent is a light petroleum fraction.

5. The process defined in claim 1 in which the solvent is carbon tetrachloride.

6. The process defined in claim 1 in which the solvent is benzene.

7. A process for the preparation of carboxylic acid esters of 7-dehydro cholesterol which comprises the process defined in claim 1 including the additional step of dehydrobrominating the 7-bromo cholesterol ester with a tertiary amine which is liquid at the reaction temperature.

AUSTIN ERNEST BIDE.
RALPH JOHN NICHOLLS.
PETER ALFRED WILKINSON.

REFERENCES CITED

The following references are of record in the file of this patent:

FOREIGN PATENTS

| Number | Country | Date |
|---|---|---|
| 574,432 | Great Britain | Jan. 4, 1946 |